United States Patent Office 3,697,260
Patented Oct. 10, 1972

3,697,260
ALUMINUM CONDUCTOR WIRE
Harold Y. Hunsicker, Lower Burrell, Pa., assignor to Aluminum Company of America, Pittsburgh, Pa.
No Drawing. Filed Dec. 30, 1969, Ser. No. 889,315
Int. Cl. C22c 21/00; C22f 1/04
U.S. Cl. 75—139
11 Claims

ABSTRACT OF THE DISCLOSURE

Improved aluminum wire generally ranging from 16 to 24 gauge (0.050 to 0.020 inch diameter), particularly useful in telephone cable and similar applications, contains careful additions to aluminum of magnesium, copper, nickel and iron and is fabricated by steps which impart to the wire a controlled amount of strain hardening. The improved wire exhibits the delicate balance of properties, including strength, ductility, bendability, electrical connection stability and electrical conductivity, to make it highly suitable for telephone service.

BACKGROUND OF THE INVENTION

The invention relates to an aluminum base alloy particularly suited for producing electrical conductor wire and to a method of producing the wire and to the wire produced. Copper is currently employed as the conductor metal in telephone exchange cable although aluminum offers attractive cost advantages and a suitable aluminum wire would be quite desirable. The aluminum wire proposed previously has, however, been marked by one or more disadvantages which restrict its usefulness. To be suitable for this application, aluminum wire must exhibit minimum tensile and yield strength levels of, respectively, 18 and 16 K s.i. Its elongation in 10 inches must be at least 2.4% and it must be capable of withstanding a number of bending cycles without fracture. In addition, it must have an electrical conductivity of at least 60% of the International Annealed Copper Standard (IACS) in order to carry the expected electrical loads. The strength, elongation and bend requirements are properties needed to insure that the insulated wire can be stranded into a multi-strand cable, covered, reeled, and unreeled and installed above or below ground level in the field without breakage of any individual wires. Also, the metal wire, in order to be insulated must be capable of sustaining the loads imposed during the application of the plastic insulation which is normally a continuous extrusion procedure which imposes tension loading on the wire. Resistance of the wire to creep deformation under tensile or compressive loading should be high since the stability of electrical conductance in compression type connectors needs to be adequate and this requires a high level of resistance to mechanical deformation at moderate stress levels.

In addition to all of the foregoing requisites for the wire product, the metal selected for the conductor must be capable of being fabricated into wire in an economical and practical fashion. It must be capable of being cast, preferably continuously, at a relatively high rate of speed. For instance, it should be capable of being cast into a 6 inch x 6 inch cross section ingot continuously at a rate of speed greater than 10 inches per minute. A typical fabrication cycle would include hot rolling the ingot to produce a rod suitable for cold drawing at a high speed generally from 2,000 to over 6,000 feet per minute which requires that the material have a considerable amount of strength and freedom from brittleness.

Aluminum electrical conductor metal containing 99.45% or more aluminum, generally designated EC metal, does not satisfy all of the foregoing criteria. Various aluminum alloys have been proposed but are marked by disadvantages in electrical conductivity, strength, or the other requisites discussed above. For instance, aluminum alloy 6201 containing magnesium and silicon is readily capable of meeting the strength requirements but requires uneconomical solution and precipitation hardening thermal treatments and cannot be relied upon to exhibit an electrical conductivity level much over 53% IACS.

DESCRIPTION

In accordance with the invention, aluminum conductor wire is provided which satisfies all the requirements outlined above. The improved conductor is composed of an alloy consisting essentially of aluminum and (a) at least one element selected from the group consisting of up to 0.35% magnesium and up to 0.65% copper, the percent Mg plus 0.4 times the percent Cu amounting to at least 0.04%, and (b) at least one element selected from the group consisting of up to 1.2% iron and up to 1.2% nickel. The total amount of iron plus nickel must fall within the range of 0.3 to 1.2% and, in addition, must amount to at least twice the amount of any silicon impurity present. In addition to the foregoing, impurities are restricted according to the following maxima: 0.15% Si, 0.05% Zn, 0.05% Ga, 0.01% Sn, 0.008% Mn, 0.008% Cr. 0.005% Ti, 0.005% V, and 0.005% Zr.

A further requirement with respect to the alloy composition in accordance with the invention requires that the amounts of the alloying additions of Mg. Cu, Fe and Ni be carefully correlated. The minimum amounts of these elements are to be determined in accordance with Equation 1.

4.6(percent Fe−0.15)+4.3(percent Ni)+12(percent Mg)+9.7(percent Cu)=3.0 minimum    (Equation 1)

The respective maximum amounts of these elements and the silicon impurity content also must be carefully correlated and are determined in accordance with Equations 2 and 3.

0.085(percent Fe−0.01)+0.059(percent)Si−0.025 +0.23(percent Cu)+0.45(percent Mg)+0.81(percent Ni−0.001)=0.17033 maximum    (Equation 2)

0.085(percent Fe−0.01)+0.059(percent Si−0.025) +0.23(percent Cu)+0.45(percent Mg)+0.043(percent Ni−0.01)=0.16300 maximum    (Equation 3)

Equation 2 applies where the Ni content is less than 0.01% whereas Equation 3 applies where the Ni content is 0.01% or higher. The composition limits are all in terms of weight percent which is likewise the case in the equations. Within the foregoing limits, a preferred practice of the invention contemplates a conductor metal composed of Al, 0.6 to 0.9% Fe and 0.07 to 0.23% Mg.

TABLE I

| Example | Fe | Ni | Mg | Cu |
|---|---|---|---|---|
| 1 | 0.30 | 0 | 0.19 | 0 |
| 2 | 0.50 | 0 | 0.12 | 0 |
| 3 | 0.70 | 0 | 0.04 | 0 |
| 4 | 0.30 | 0 | 0 | 0.31 |
| 5 | 0.50 | 0 | 0 | 0.15 |
| 6 | 0.60 | 0 | 0 | 0.10 |
| 7 | 0.15 | 0.30 | 0.14 | 0 |
| 8 | 0.15 | 0.30 | 0 | 0.18 |

TABLE II

| Example | Fe | Ni | Mg | Cu | Si |
|---|---|---|---|---|---|
| 9 | 0.30 | 0.001 | 0.32 | 0 | 0.04 |
| 10 | 0.50 | 0.001 | 0.28 | 0 | 0.04 |
| 11 | 0.75 | 0.001 | 0.24 | 0 | 0.04 |
| 12 | 1.00 | 0.001 | 0.19 | 0 | 0.04 |
| 13 | 1.20 | 0.001 | 0.15 | 0 | 0.04 |
| 14 | 0.75 | 0.001 | 0.13 | 0 | 0.12 |
| 15 | 0.15 | 0.50 | 0.29 | 0 | 0.04 |
| 16 | 0.15 | 0.50 | 0.27 | 0 | 0.12 |
| 17 | 0.30 | 0.001 | 0 | 0.63 | 0.04 |
| 18 | 0.50 | 0.001 | 0 | 0.56 | 0.04 |
| 19 | 0.75 | 0.001 | 0 | 0.46 | 0.04 |
| 20 | 1.00 | 0.001 | 0 | 0.37 | 0.04 |
| 21 | 1.20 | 0.001 | 0 | 0.29 | 0.04 |
| 22 | 0.15 | 0.50 | 0 | 0.56 | 0.04 |
| 23 | 0.15 | 0.50 | 0 | 0.54 | 0.12 |
| 24 | 0.40 | 0.40 | 0.10 | 0.22 | 0.08 |

To illustrate the various minimum values for the elements added in accordance with the invention, reference is made to Table I which sets out examples showing the combined minima for various alloying combinations. In the examples, the figures underlined are those determined by the equation. The other figures were fixed. For instance, no Ni, 0.5% Fe and no Mg means that a minimum of 0.15% Cu must be included as shown in Example 5. In a similar manner, the maximum amount of an element can be determined by Equations 2 and 3 and several examples illustrating such are set out in Table II. Here again, the underlined figures are those determined from the equation and the other figures are fixed or assumed values. Of course, in using Equations 2 and 3, it must be noted that some combinations considered might not satisfy the equation by the inclusion of excessive amounts of two or three elements. That is, if fairly high amounts of copper, iron and nickel are included and it is attempted to solve the equation to determine how much Mg can be included, the calculation may indicate a negative amount. This is translated into an indication that the Cu, Fe and Ni are already excessive and not tolerable even in the complete absence of any Mg.

The composition limits set forth herein must be carefully followed in order to achieve the unique combination of strength, elongation and conductivity contemplated in practicing the invention. Following these limits, especially along with the hereinafter set forth fabrication method, assures meeting the minimum strength, elongation, electrical conductivity, bendability and connection stability requirements outlined earlier.

While the above-described composition limits must be carefully followed in order to achieve the advantages of the invention, it is also important that the electrical conductor wire be properly fabricated such that the potential of the alloy is realized. In accordance with the invention, the aluminum metal is first provided as a melt. If excessive amounts of V or Ti are present, the melt may, prior to making any alloy additions, be treated by adding B to precipitate these elements. Analysis of the melt may indicate that some of the elements to be included in the practice of the invention are already present to some extent. Accordingly, this must be taken into consideration when selecting the additions which are made in strict accordance with the above set forth composition limits. The melt is cast into an ingot which may be produced by continuous casting. The size of the ingot is not especially important although an ingot approximately 6 inches square in cross section proves quite satisfactory. The ingot is heated to a temperature of 650–800° F. and held at this temperature for a time of 1 to 10 hours in order to assure that all the soluble elements are in solution and are homogeneously distributed through the ingot. The temperature may vary but should be at least 630° F.

The homogenized ingot is fabricated into a rod from which the wire is drawn. Suitable metal working operations include rolling with contoured rollers to produce a rod of circular cross section usually having a diameter of about 3/8 or 7/16 inch. During these working operations, the temperature is controlled such that some amount of strain hardening is imparted to the rod. The amount of strain hardening must be equivalent to that of a cold reduction of from 15 to 25% of the cross section before working. This may be accomplished by initially breaking down the ingot at a relatively high temperature of about 700° F. At some point in the fabrication sequence, the metal temperature is lowered by the application of cooling and lubricating fluids to an amount of, for instance, 500° F. and thereafter lowered still further so that the final temperature is not over 450° F. Various manipulations of temperature and extent of working at a temperature will produce the same effect such that the invention is not limited to any particular schedule. However, it is important that the rod produced by the rolling or other metal working operations have the prescribed amount of strain hardening. In order to determine whether the rod has the prescribed amount of strain hardening, tensile tests may be compared with the results of a standard which has actually been cold reduced by a cold reduction of 15 to 25%. This is readily determined in accordance with existing procedures. For instance, in the 3/8 inch or 7/16 inch rod, the tensile and yield strength levels for a strain hardening effect equivalent to a 20% cold reduction are, respectively, generally around 18–20 K s.i. and 16–17 K s.i.

The rod is cold worked to produce a wire product. The working operation here is by cold drawing wherein the rod is pulled through a succession of dies having openings of gradually diminishing size. This cold drawing imparts to the wire a severely strain hardened temper condition. The extent of the strain hardening in the wire must be at least that amount equivalent to a cold reduction of at least 90% in cross section. The wire so produced is in a size which is approximately one-half to one gauge size larger than the desired size of the final product. A one gauge size increment amounts to about 20%. Accordingly, the practice of the invention contemplates that the severely strain hardened wire has a cross sectional area about 8% to 20% larger than that of the final wire product. The final wire product ranges in size from about 0.020 inch to about 0.05 inch. Accordingly, the severely strain hardened wire would range in size from approximately 0.0210 inch to about 0.057 inch. It is advisable that no annealing steps be performed in connection with the cold drawing operation since such would soften or relieve the strain hardening condition which is desired at this point in the fabrication sequence. It is significant that the improved alloy can sustain the severe working, even in the smallest sizes contemplated and even at drawing speeds well in excess of 2,000 feet per minute, without a substantial number of breakage incidents and the attendant costly shut-downs. This characteristic of the improved alloy is extremely important from an economic standpoint.

After the wire has been imparted with the severely strain hardened temper, it is annealed. This may be accomplished by heating to a temperature of about 600° to 700° F. for about 15 minutes to 3 or 4 hours. While the annealing treatment completely softens the strain hardened temper, the results of the hard temper appear in the annealed structure which is extremely fine. The annealing treatment improves the electrical conductivity of the wire above its level in the hard temper.

The wire is cooled to about room temperature and then cold drawn to final gauge size. As indicated above, the extent of the cold reduction amounts to a cross sectional area decrease of 8 to 20%. The wire so produced will consistently exhibit minimum tensile and yield strength levels of 18 K s.i. and 16 K s.i., respectively, together with a minimum elongation of 2.4% and a minimum electrical conductivity of 60% IACS.

In order to demonstrate the advantages of the invention, the following illustrative examples proceed. Wires of two compositions were fabricated in accordance with the invention whereby they were continuously cast into ingots having a 6 inch by 6 inch square cross section which were then hot and continuously rolled into a round rod about ⅜ inch in diameter. During the continuous rolling phase, the metal temperature was controlled at levels ranging from a high of about 700° F. to a low level of about 400° F. The condition of this rod was substantially the same as that which would result from a 20% cold reduction since its tensile strength was 19.5 K s.i. which corresponds very closely to a 20% cold reduced standard level of 18–20 K s.i. This rod was then cold drawn to wire of three sizes, 0.0216, 0.0214 and 0.0210 inch, in diameter which wire was in the severely strain hardened temper, the cold reduction amounting to over 93%. This wire was then annealed at approximately 650° F. for 30 minutes. Thereafter, the wire was cold drawn to produce 24 gauge wire having a diameter of 0.0201 inch nominal. The percentage reduction ranged from 8.4% for that drawn from the smallest size annealed wire to 12.8% for that drawn from the largest size. The resulting wire was tested for tensile propertiets and electrical conductivity. The compositions tested and the measurements are listed respectively in Tables II and IV.

TABLE III

| Composition | Si | Fe | Cu | Mg | Ni |
|---|---|---|---|---|---|
| A | 0.10 | 0.63 | 0.01 | 0.15 | 0.003 |
| B | 0.08 | 0.74 | 0.26 | 0.001 | 0.004 |

TABLE IV

| Material | Percent C.W. after anneal | T.S., K s.i. | Y.S., K s.i. | Percent elong. in 10 inches | Cond. percent IACS |
|---|---|---|---|---|---|
| Comp. A | 8.4 | 19.2 | 18.0 | 5.4 | 61.0 |
|  | 10.2 | 19.7 | 18.6 | 5.9 | 60.8 |
|  | 12.8 | 20.6 | 18.9 | 3.9 | 60.7 |
| Comp. B | 8.4 | 19.6 | 17.2 | 9.7 | 61.4 |
|  | 10.2 | 19.7 | 17.8 | 6.2 | 61.4 |
|  | 12.8 | 21.2 | 19.8 | 3.1 | 61.2 |
| EC-H 19 | 90+ | 24.9 | 22.7 | 1.3 | 63.2 |
| ED-H 12 | 20 | 14.5 | 13.7 | 1.5 | 63.4 |

From the foregoing tables, it is quite apparent that the improved alloys, compositions A and B, more than satisfy the requirements for tensile and yield strength together with elongation and electrical conductivity. These wires could easily withstand the electrical insulation continuous extrusion procedure and all exhibit the required conductivity for use in telephone exchange cable. EC wire, on the other hand, fell short in combining the desired strength and flexibility.

In addition to tensile properties and elongation it is essential, as mentioned earlier, that the wire exhibit a certain amount of bendability such that it can withstand the repeated bending often encountered in twisting and wrapping several strands of wire to make a cable, in routing the wire or cable, in making connections with the wire, and the like. One test, referred to as a free bend test, calculated to determine bendability, at least on a comparative basis, is that where a two inch length of wire is flexed until its ends meet and then straightened as much as possible without putting tension on the wire. The test is continued until the wire breaks. Sustaining 20 or more free bends indicates that the wire has good bendability and would not present breakage problems during installation and the like. In free bend tests the improved wire, for the most part, sustained over 30 bends with some of the wires reaching well over 40 bends before breaking.

Still another desirable characteristic of good telephone exchange cable is its ability to maintain a stable electrical resistance level in an electrical connection. The electrical resistance across the connection should be stable and within an acceptable limit. If the resistance tends to increase with usage the connection is considered unstable and somewhat unreliable. This is one problem which has sometimes marked previous aluminum conductor wire which often exhibited excessive resistance levels and the unreliability associated therewith. Tests indicate that, in addition to the advantages discussed above, the improved wire exhibits a stable and acceptable conductance in electrical connections thus further enhancing its usefulness.

While the invention has been described in terms of preferred embodiments, the claims appended hereto are intended to encompass all embodiments which fall within the spirit of the invention.

Having thus described my invention and certain embodiments thereof, I claim:

1. A method of producing electrical conductor wire comprising:
   (1) providing a body of an aluminum base alloy consisting essentially of aluminum and (a) at least one element selected from the group consisting of up to 0.35% magnesium and up to 0.65% copper, the percent Mg plus 0.4 times the percent Cu amounting to at least 0.04%, and (b) at least one element selected from the group consisting of up to 1.2% iron and up to 1.2% nickel, the total of iron plus nickel falling within the range of 0.3 to 1.2%, the respective minimum amounts of said magnesium, copper, iron and nickel further being in accordance with Equation 1 and the maximum amounts thereof being in accordance with Equations 2 and 3, said alloy having the following maximum limits for impurities: 0.15% for Si, 0.008% for Mn and Cr, 0.005% for Ti, V and Zr, 0.05% for Ga and Zn and 0.01% for Sn,
   (2) working said body into a rod suitable for drawing into wire, said working imparting to said rod an amount of strain hardening equivalent to that which would result from a cold reduction of from 15% to 25% in cross sectional area,
   (3) cold working said rod to produce a wire, said cold working imparting to said wire a severely strain hardened condition equivalent to that which would be imparted by a cold reduction of at least 90% in cross sectional area,
   (4) annealing said wire.

2. The method according to claim 1 wherein said alloy contains 0.6 to 0.9% Fe and 0.07 to 0.23% Mg.

3. The method according to claim 1 wherein in step (4) annealing is effected by heating to a temperature of from 600° to 700° F. for 15 minutes to four hours.

4. A method of producing electrical conductor wire comprising:
   (1) providing a body of an aluminum base alloy consisting essentially of aluminum and (a) at least one element selected from the group consisting of up to 0.35% magnesium and up to 0.65% copper, the percent Mg plus 0.4 times the percent Cu amounting to at least 0.04%, and (b) at least one element selected from the group consisting of up to 1.2% iron and up to 1.2% nickel, the total of iron plus nickel falling within the range of 0.3 to 1.2%, the respective minimum amounts of said magnesium, copper, iron and nickel further being in accordance with Equation 1 and the maximum amounts thereof being in accordance with with Equations 2 and 3, said alloy having the following maximum limits for impurities: 0.15% for Si, 0.008% for Mn and Cr, 0.005% for Ti, V and Zr, 0.05% for Ga and Zn and 0.01% for Sn,
   (2) working said body into a rod suitable for drawing into wire, said working imparting to said rod an amount of strain hardening equivalent to that which would result from a cold reduction of from 15% to 25% in cross sectional area, (3) cold working said rod to produce a wire at one gauge size over the final gauge size said cold working imparting to said wire a severely strain hardened condition equivalent to that which would be imparted by a cold reduction of at least 90% in cross sectional area, (4) annealing said wire by heating to a temperature of from 600 to 700° F. for 15 minutes to 4 hours, (5) cold working said wire to a cold reduction of 8 to 20% in cross sectional area to produce the wire product in final gauge size, said wire product exhibiting a minimum electrical conductivity of 60% IACS and minimum tensile and yield strength levels of 18 K s.i. and 16 K s.i., respectively, a minimum elongation of 2.4% in 10 inches together with good bendability and good connection resistance stability.

5. The method according to claim 4 wherein said alloy contains 0.6 to 0.9% Fe and 0.07 to 0.23% Mg.

6. An aluminum base alloy consisting essentially of aluminum and up to 0.35% magnesium, 0.1 to 0.65% copper, the percent Mg plus 0.4 times the percent Cu amounting to at least 0.04%, and at least one element selected from the group consisting of up to 1.2% iron and up to 1.2% nickel, the total amount of iron plus nickel falling within the range of 0.3 to 1.2%, the respective minimum amount of said magnesium, copper, iron and nickel further being in accordance with Equation 1 and the maximum amounts thereof being in accordance with Equations 2 and 3, said alloy having the following maximum limits for impurities: 0.15% for Si, 0.008% for Mn and Cr, 0.005% for Ti, V and Zr, and 0.05% for Ga and Zn and 0.01% for Sn said alloy being characterized by the ability to be fabricated into wire having a minimum tensile strength of 18 K s.i., a minimum yield strength of 16 K s.i., a minimum elongation is 10 inches of 2.4%, a minimum electrical conductivity of 60% IACS, good bendability and good stability of conductance in electrical connections.

7. An electrical conductor wire product composed of an aluminum base alloy consisting essentially of aluminum and (a) at least one element from the group consisting of up to 0.35% magnesium and 0.1 to 0.65% copper, the percent Mg plus 0.4 times the percent Cu amounting to at least 0.04%, and (b) at least one element selected from the group consisting of up to 1.2% iron and up to 1.2% nickel, the total amount of iron plus nickel falling within the range of 0.3 to 1.2%, the respective minimum amount of said magnesium, copper, iron and nickel further being in accordance with Equation 1 and the maximum amounts thereof being in accordance with Equations 2 and 3, said alloy having the following maximum limits for impurities: 0.15% for Si, 0.008% for Mn and Cr, 0.005% for Ti, V and Zr, and 0.05% for Ga and Zn and 0.01% for Sn., said wire product being in the condition resulting from (a) working a body of said alloy into a rod suitable for drawing into wire, said working imparting to said rod an amount of strain hardening equivalent to that which would result from a cold reduction of 15% to 25% in cross sectional area, (b) cold working said rod to produce a wire product, said working imparting to said wire a severely strain hardened condition which would be equivalent to that imparted by cold reduction of at least 90% in cross sectional area and (c) annealing said wire, said wire in said condition exhibiting a minimum electrical conductivity of 60% IACS and good strength and elongation together with good bendability and good connection resistance stability.

8. The conductor wire product according to claim 7 wherein said alloy contains 0.6 to 0.9% Fe and 0.07 to 0.23% Mg.

9. An electrical conductor wire product composed of an aluminum base alloy consisting essentially of aluminum and (a) at least one element from the group consisting of up to 0.35% magnesium and 0.1 to 0.65% copper, the percent Mg plus 0.4 times the percent Cu amounting to at least 0.04%, and (b) at least one element selected from the group consisting of up to 1.2% iron and up to 1.2% nickel, the total amount of iron plus nickel falling within the range of 0.3 to 1.2%, the respective minimum amount of said magnesium, copper, iron and nickel further being in accordance with Equation 1 and the maximum amounts thereof being in accordance with Equations 2 and 3, said alloy having the following maximum limits for impurities: 0.15% for Si, 0.008% for Mn and Cr, 0.005% for Ti, V and Zr, and 0.05% for Ga and Zn and 0.01% for Sn, said wire product being in the condition resulting from (a) working a body of said alloy into a rod suitable for drawing into wire, said working imparting to said rod an amount of strain hardening equivalent to that which would result from a cold reduction of 15% to 25% in cross sectional area, (b) cold working said rod to produce a wire product, said working imparting to said wire a severely strain hardened condition which would be equivalent to that imparted by cold reduction of at least 90% in cross sectional area, (c) annealing said wire and (d) further cold working the annealed wire by a cold reduction of 8 to 20% in cross sectional area, said conductor wire product in said condition exhibiting a minimum electrical conductivity of 60% IACS and minimum tensile and yield strength levels of 18 K s.i. and 16 K s.i., respectively, a minimum elongation of 2.4% in ten inches together with good bendability and good connection resistance stability.

10. The conductor wire product according to claim 9 wherein said alloy contains 0.6 to 0.9% Fe and 0.07 to 0.23% Mg.

11. The improved conductor wire product according to claim 9 wherein the product ranges in final size from 0.020 to 0.05 inch.

References Cited

UNITED STATES PATENTS 2,572,562    10/1951    Harrington _____ 148—159
1,704,253    3/1929    Hybinette _____ 148—12.7

OTHER REFERENCES

Metal Progress, May 1953, Harrington et al., "Cond-Al"—A Tailor-Made Aluminum Alloy of High Creep Strength and Conductivity, pp. 90–93.

L. DEWAYNE RUTLEDGE, Primary Examiner

W. W. STALLARD, Assistant Examiner

U.S. Cl. X.R.

75—142, 144; 148—11.5 A, 12.7, 32, 32.5